Dec. 21, 1954 K. SCHLESINGER 2,697,798

HIGH-VOLTAGE REGULATION SYSTEM

Filed Aug. 12, 1949 2 Sheets-Sheet 1

INVENTOR.
Kurt Schlesinger

BY

Norman L. Mueller [signature]

Attys.

HIGH-VOLTAGE REGULATION SYSTEM

Filed Aug. 12, 1949 2 Sheets-Sheet 2

INVENTOR.
Kurt Schlesinger

BY Foorman L. Mueller

Attys.

2,697,798

HIGH-VOLTAGE REGULATION SYSTEM

Kurt Schlesinger, Maywood, Ill., assignor to Motorola, Inc., Chicago, Ill., a corporation of Illinois Application August 12, 1949, Serial No. 109,938

5 Claims. (Cl. 315—27)

This invention relates generally to voltage regulation devices and more particularly to a device for regulating very high voltage sources such as required for operating cathode ray tubes.

It is, in general, desired that the power source from which electrical equipment is operated retain the same voltage value regardless of the current drawn by the equipment. However, most high voltage sources in use include internal resistance, and when current is drawn therefrom a voltage drop is produced due to the flow of current in the internal resistance so that the output voltage of the source will decrease. Various voltage regulation arrangements have been produced for use in low voltage applications but most of these are not suitable for very high voltage applications when the current drain is very small. The presently known regulation systems for use on high voltage circuits have generally been complicated and may require bias voltages which are not available without providing additional equipment. Although non-linear resistance elements such as elements made of uranium dioxide have been provided, these elements do not actually provide a negative resistance as necessary for proper compensation, and units available have not been satisfactory for high voltage use.

In electronic equipment employing cathode ray tubes such as television and radar systems, the voltage applied to the high voltage anodes must be held constant in order to produce a desirable picture. This is because increased current due to a brighter picture causes the anode voltage to drop and as the anode voltage is reduced the deflection sensitivity of the cathode ray beam increases. As a result the picture size produced by the deflecting means varies with the picture brightness to produce an undesirable result. This characteristic is particularly important in sequential color television systems as the brightness in successive fields of different color may vary causing the picture size to vary resulting in color fringes.

It is, therefore, an object of the present invention to provide a voltage regulation system which compensates for the normal voltage drop of a high voltage power supply resulting from increased load current through the internal resistance of the supply.

A further object of this invention is to provide a voltage regulation system for use with high voltage sources for cathode ray tubes for holding the anode voltage constant so that the picture size remains fixed independent of the picture brightness.

Another object of this invention is to provide a regulation system for an oscillator type high voltage power supply in which the amplitude of the oscillations is controlled in accordance with the load current drawn from the power supply so that the load voltage remains substantially constant.

A feature of this invention is the provision of a high voltage power supply having an oscillator and a rectifier and a control circuit coupled to the load of the rectifier for controlling the voltage applied to the oscillator.

A further feature of this invention is the provision of a high voltage power supply having an oscillator including a screen grid tube, and a rectifier including a resistance in the load circuit across which a control voltage is produced which varies with the load current, and a controlling circuit operating from the control voltage for providing a varying voltage for the screen grid of the tube so that the amplitude of oscillations is controlled to provide a constant voltage at the output of the rectifier.

Another feature of this invention is the provision of a high voltage oscillator type power supply including a control circuit coupled to the load circuit of the rectifier and to the tube of the oscillator to control the amplitude of oscillations to compensate for varying load currents, with the control circuit having a loop gain of unity to provide substantially constant voltage output over a predetermined range of load currents.

Further objects, features and advantages will be apparent from a consideration of the following description when taken in connection with the accompanying drawings in which.

In practicing the invention there is provided a high voltage power supply system including an oscillator circuit and rectifying means. The oscillator circuit may be either self excited or triggered by a high frequency source and may produce oscillations or pulses of a single polarity or having both positive and negative polarity. The rectifying means may include a single diode for rectifying pulses of a single polarity, a pair of diodes for rectifying pulses of both polarities and/or diodes arranged in various voltage multiplying arrangements. A control circuit provides feedback from the output of the rectifier to the oscillator. This circuit may include a resistance in the output circuit of the rectifier across which a voltage is developed which varies with the load current. This voltage is applied to a control tube coupled to the oscillator to increase the amplitude of oscillations as the load increases so that the voltage applied to the rectifiers is increased enough to compensate for the increased voltage drop in the power supply resulting from the increased load current. This may be accomplished by connecting the control tube in parallel with the screen grid of the oscillator tube through a resistor to the B+ potential. Then as the load current increases, the current through the control tube is decreased so that the voltage across the resistor is decreased and the potential on the screen grid is increased. The control circuit can be arranged to have a loop gain of one so that the voltage applied to the load remains substantially constant through relatively wide variations in the load current.

Figures 1, 2, 3:
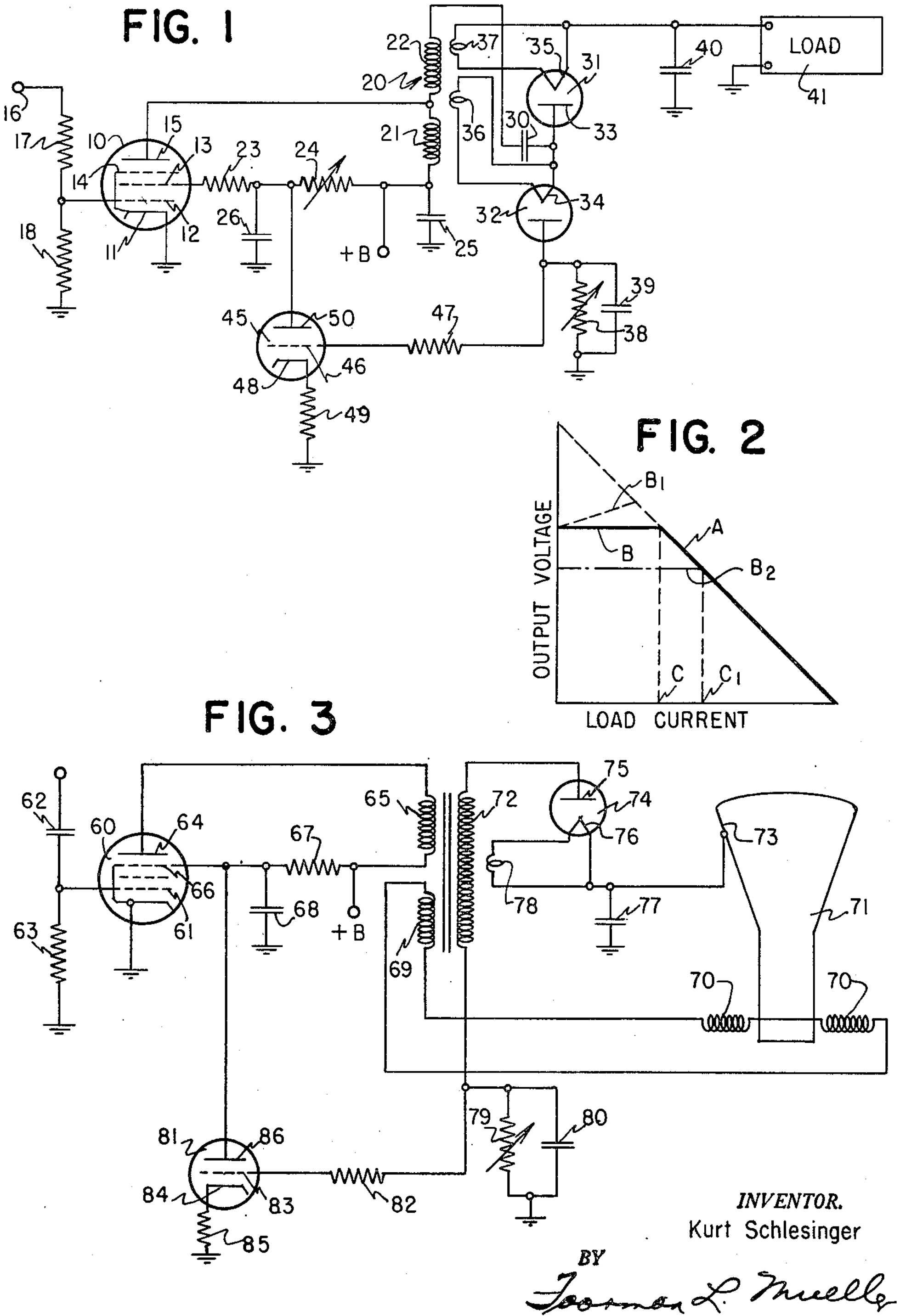
Fig. 1 illustrates a high voltage power supply including the voltage regulation system in accordance with the invention.
Fig. 2 is a chart illustrating the operation of the voltage regulation system.
Figs. 3 and 4 illustrate the application of the voltage regulation system as illustrated in Fig. 1 to other types of high voltage power supplies.

Referring now to the drawings, in Fig. 1 there is illustrated a high voltage oscillator power supply including the voltage regulation system in accordance with the invention. The power supply includes a pentode electron discharge valve 10 including a cathode 11, control grid 12, screen grid 13, suppressor grid 14 and plate 15. The valve 10 functions as an oscillator which is triggered by a source connected to terminal 16 and which is applied to the control grid 12 through resistor 17. The control grid 12 is biased with respect to the cathode 11 by the resistor 18. The plate 15 of the valve 10 is connected to a coil 20, with the plate being connected to a terminal intermediate the portions 21 and 22 of the coil. The plate is connected through the coil portion 21 to the +B voltage source. The screen grid 13 is also connected to the +B source through resistor 23 and variable resistor 24. The condensers 25 and 26 provide high frequency bypass.

The operation of the oscillator 10 will be well understood by those skilled in the art. The power supply illustrated in Fig. 1 is in accordance with my copending application, Serial No. 28,030 filed May 19, 1948, subject—High Voltage Generator. In this system a voltage wave is applied to the terminal 16 and triggers the valve 10 which is biased so that both positive and negative pulses are produced in the coil portion 21. These pulses are increased in amplitude by the transformer action so that larger pulses are produced across the entire coil 20. These pulses are applied through condenser 30 to two diode rectifiers 31 and 32. The rectifiers are connected so that positive pulses are rectified in the diode 31, and negative pulses are rectified in the diode 32. The cathode 34 of the diode 32 and the cathode 34 of the diode 31 are connected respectively to windings 36 and 37 which provide current for heating the cathodes. The diodes 31 and 32 are connected in series with each other and in series with the parallel combination of variable resistor 38 and condenser 39. This entire series circuit is connected across the filter condenser 40 and the load 41. The voltage developed by the diodes is therefore smoothed by the condenser 40 and applied to the load 41.

The high voltage system described above has the disadvantage that increasing load current drawn by the load 41 will increase the voltage drop in various components of the system to thereby decrease the voltage which is applied to the load 41. This is a general characteristic of high voltage systems of all types as will be more fully explained. This disadvantage is particularly important when the high voltage supply is used for providing anode potential for a cathode ray tube as in a television receiver. A television image reproduced on a cathode ray tube has lighter and darker areas with the lighter areas being produced by increase in intensity of the electron beam. This results in increased current drain on the high voltage power supply. Therefore, it is apparent that the load current will fluctuate continuously with the intensity of the cathode ray beam. To reproduce the image the cathode ray beam must be deflected in a systematic pattern which must be exact in order to prevent distortion of the picture. However, the amount of deflection of the beam produced by the deflection means depends upon the acceleration of the beam, or potential on the anode of the cathode ray tube. Therefore, variations in anode potential due to variations in the current drain will change the deflection sensitivity causing larger deflection for dark portions of the picture and smaller deflections for brighter portions. This is obviously undesirable.

Variations in the output voltage of the high voltage power supply due to variation in load current may be reduced and completely eliminated for relatively wide variations in current by the control circuit including the electron discharge valve 45. The valve 45 includes a grid 46 to which the voltage across the resistor 38 is applied through resistor 47. The cathode 48 of the triode is grounded through resistor 49 and the plate 50 is coupled to the screen grid 13 of the tube 10, being connected to the common connectors between resistors 23 and 24. It is apparent that the voltage appearing across resistor 38 will depend upon the current drawn by the load. That is, the load current must flow through the resistor 38 so that the voltage thereacross will be directly proportional to the load current. The condenser 39 is provided for imparting the desired time constant so that rapid fluctuations will not appear across the resistor 38. The voltage across resistor 38 is negative so that a negative potential will be applied through resistor 47 to the grid 46 and the current through the valve 45 will decrease with increasing load current. In the circuit shown, the screen grid 13 of the valve 10 and the plate 50 of the valve 45 are connected in parallel, and both are connected in series with the resistor 24 to the +B source. Therefore, when the tube 45 draws current this will cause a voltage drop across resistor 24 to reduce the potential applied to the screen 13. Since the voltage applied to the grid 46 is negative and becomes increasingly negative as current to the load 41 increases, the tube 45 will draw decreasing current as the load increases. This decreased current through tube 45 will tend to decrease the voltage drop through resistor 24 so that the voltage applied to the screen grid 13 will increase. This will increase the amplitude of oscillations produced in the coil 20 so that the voltage applied to the load 41 will tend to remain constant.

The operation of the voltage regulation system will be more easily understood by a consideration of Fig. 2 which illustrates the operation of the high voltage power supply and the regulation system. The inclined line A (partly dotted) illustrates the variations of output voltage of the power supply with varying load current. The slope of the line of course depends upon the scales used, but a substantially linear relation exists with the output voltage decreasing with increasing load current. As previously stated, this is due to the voltage drops across the components of the power supply due to increasing current therein. The regulation system reduces the output voltage at small load currents so that the voltage remains substantially constant over a predetermined range of load currents. This is illustrated by the line B of Fig. 2. The line B is shown substantially horizontal or at constant voltage for all load currents up to the load current corresponding to point C. By variation of the variable resistor 38 the loop gain of the feedback circuit can be changed to provide compensation other than unity. For example, if the resistance of 38 is increased, over-compensation might be provided and the output voltage would increase as indicated by curve $B_1$. The level at which the voltage is regulated may also be controlled, this being controlled by the resistor 49 in the cathode circuit. By providing a larger resistor at 49 uniform voltage can be obtained for larger variations in load current but at a lower output voltage. This is illustrated by the dot-dash line marked $B_2$. This will provide a substantially constant voltage for output currents extending up to the value indicated at $C_1$. It is apparent that the increased range of control results in a greater loss of voltage so that in most applications control will be provided only over the range required as under this condition the voltage loss is held to a minimum.

In Fig. 3 the voltage regulation system in accordance with the invention is illustrated as applied to a combination high voltage power supply and horizontal deflection system such as is commonly used in television receivers. This system includes an oscillator tube 60 of the pentode type having a control grid 61 to which a sawtooth wave is applied through condenser 62 and across resistor 63. The plate 64 of the pentode is connected to a winding 65 of a transformer and produces a sawtooth current wave therein. +B potential is applied to the plate 64 through the winding 65 and to the screen grid 66 of the tube through the resistor 67. Condenser 68 provides high frequency bypass. The sawtooth current wave produced in winding 65 is induced through transformer action to the winding 69 which is connected to deflection coils 70 positioned on the neck of a cathode ray tube 71. The sawtooth current in the coil 70 produces a fluctuating field which deflects the beam of the cathode ray tube 71. A third winding 72 is inductively connected to the windings 65 and 69 for providing a high voltage for the anode 73 of the cathode ray tube 71. As is well known, a very high voltage pulse is produced when the current in the coils 70 rapidly reduces from a high value. The winding 72 has a large number of turns so that the amplitude of this pulse is increased. The voltage across the winding 72 is rectified by the diode 74 to produce a high direct current voltage for the anode 73. The plate 75 of the diode is connected to the coil 72 and the cathode 76 is connected to filter condenser 77 and to the anode 73. A winding 78 provides current for heating the cathode 76 of the diode 74.

In series with the rectifier circuit there is connected a variable resistor 79 bridged by condenser 80. The load current drawn by the tube 71 flows through the resistor 79 so that the voltage thereacross is proportional to the current drawn by the tube 71. This voltage is applied to the control tube 81 which functions in the same manner as the control tube 45 of Fig. 1. That is, a negative voltage is produced across resistor 79 which is applied through resistor 82 to the control grid 83 of the triode 81. The cathode 84 of the triode is connected through resistor 85 to ground and the plate 86 thereof is connected to the screen grid 66 of the pentode oscillator 60. Therefore as the current in the load increases the negative potential on the grid 83 is increased to reduce the current drawn by the plate 86 of the triode 81. This will reduce the current through the resistor 67 so that the voltage drop across the resistor 67 is decreased and the potential applied to the screen grid 66 of the tube 60 is increased. This will obviously increase the amplitude of the oscillations produced in the tube 60 so that the output voltage applied to the anode 73 of the cathode ray tube will remain constant. In this circuit, which also provides the horizontal deflecting current, the horizontal deflecting current will also be stabilized by the voltage regulation system just described.

Figures 4, 5:
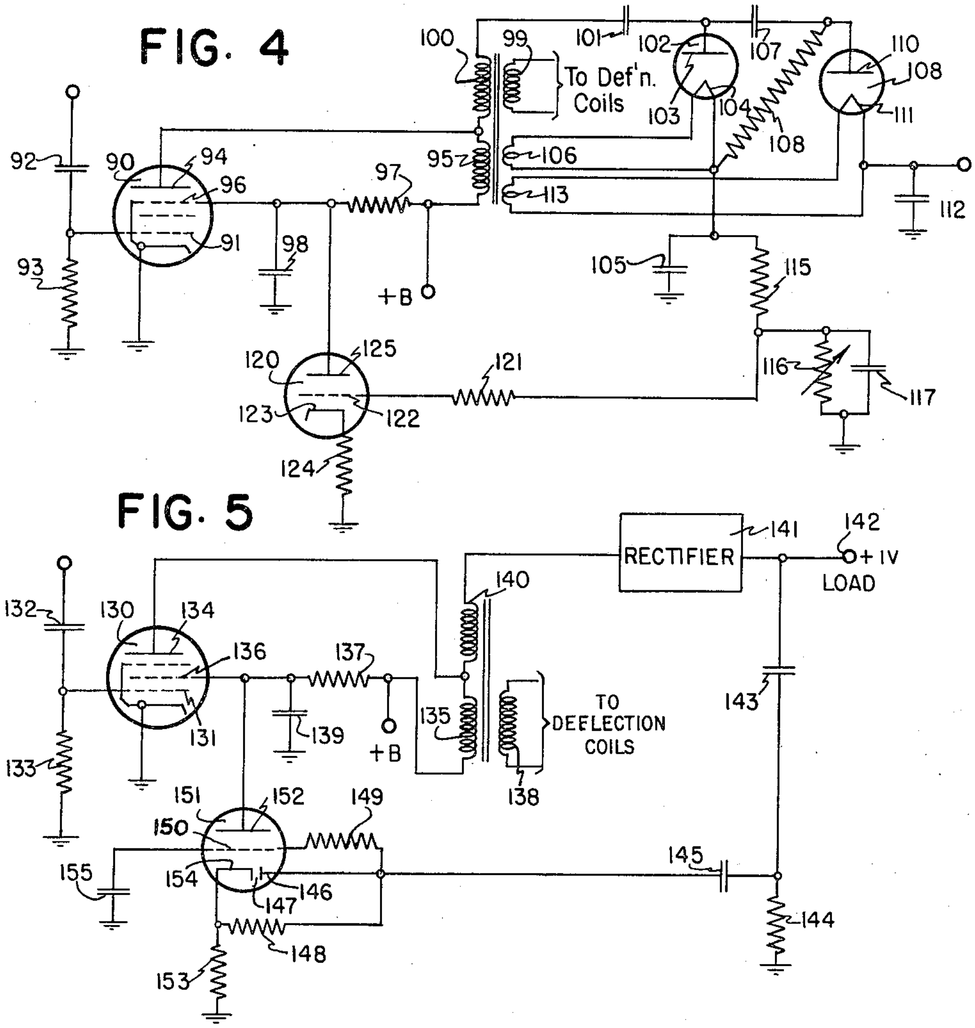
Fig. 5 illustrates another embodiment of the voltage regulation system.

In Fig. 4 there is illustrated a high voltage power supply generally similar to that of Fig. 3 in which the horizontal deflection current may also be produced. However, in Fig. 4 a voltage doubler circuit is provided for increasing the high direct current voltage output. The system includes a pentode tube 90 having a grid 91 to which a triggering wave may be applied through the condenser 92 and across resistor 93. The plate 94 of the pentode is connected through winding 95 to a source of +B potential. This +B potential is also connected to the screen grid 96 of the tube through resistor 97 with condenser 98 providing high frequency bypass. In such a system sawtooth currents may be produced in the winding 95 and applied by transformer action to winding 99 connected to deflection coils, not shown.

A winding 100 is provided on the transformer and is connected in series with winding 95 so that the voltages across the two windings are additive. This total voltage is then converted into a high direct current voltage by a doubler rectifier circuit. The rectifier circuit includes a first section including condenser 101 and diode 102. The plate 103 of the diode is connected to condenser 101 to provide a voltage across condenser 101 equal to the positive pulses provided across the windings 95 and 100. The cathode 104 of the diode is connected to ground through condenser 105, and is also connected to a winding 106 which provides heater current therefore. The second section of the rectifier circuit includes condenser 107, resistor 108 and diode 109. These elements are connected in a well known way so that the voltage pulse is added to the direct current voltage produced by the first section to provide voltage doubling. The plate 110 of the diode 109 is connected to the cathode 104 of the diode 102 by the resistance 108, which has a large value, and is also connected to the plate 103 of the diode 102 by the condenser 107. The cathode 111 of the diode 108 provides the output of the rectifier circuit which is filtered by the condenser 112. The cathode 111 is connected to a winding 113 which provides heater current in the usual way. A return path to ground for the current drawn from the power supply is provided through resistors 108, 115 and 116 which are bridged across the condenser 105. Resistor 116 may be variable and is bridged by condenser 117.

The voltage regulation system is applied to the power supply of Fig. 4 in exactly the same way as in Figs. 1 and 3. The voltage appearing across resistor 116 will necessarily vary with the load current of the power supply. This voltage is applied to control tube 120 through resistor 121 which is connected to the grid 122 of the control tube. The cathode 123 of the control tube is connected through resistor 124 to ground, and the plate 125 of the tube is connected to the screen grid 96 of the oscillator tube 90. As previously described increasing load current produces increasing voltage across resistor 116 which is negative and decreases the current drawn by the control tube 120. This decreases the current drawn through resistor 97 to decrease the voltage drop thereacross, and thereby increases the voltage applied to the grid 96. This circuit therefore produces voltage regulation in the manner fully described in connection with Fig. 1.

In Fig. 5 there is illustrated a further embodiment of the voltage regulation system in accordance with the invention, in which the control voltage which varies with the load current is obtained from the high voltage filter. The system is illustrated in a high voltage power supply having an oscillator tube 130 including a control grid 131 to which triggering pulses are applied through condenser 132 and across resistor 133. The valve 130 includes a plate 134 connected through winding 135 to +B source of potential. The tube 130 also includes a screen grid 136 connected to the +B potential through resistor 137. This oscillator may produce sawtooth current waves which may be applied through the winding 138 to deflection coils (not shown) for deflecting the beam of a cathode ray tube. A winding 140 is connected in series with the winding 135 and the total voltage appearing across the two windings may be rectified by the rectifier 141 to provide a high voltage at the terminal 142. Any type of rectifier system may be used including either a single diode or a system providing voltage multiplication. The output of the rectifier may be filtered by a condenser 143 connected in series with resistor 144.

Figure 6:
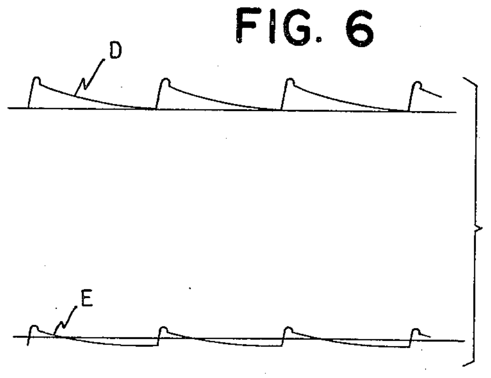
Fig. 6 is a curve chart illustrating operation of the system of Fig. 5.

The resistor 144 in the filter will have a small value (for example, 100 ohms) so that the voltage thereacross will produce only minor variations in the voltage applied to the load. This is illustrated in Fig. 6 in which curve D illustrates the output voltage from the rectifier, and curve E illustrates the voltage drop across the resistor 144. As the current in the load increases and the voltage output of the rectifier decreases, the voltage across resistor 144 will decrease. This voltage is applied through condenser 145 to the plate 146 of diode 147 so that the positive portions of the voltage across resistor 144 will be rectified and appear across resistor 148. The positive bias thus produced is applied through resistor 149 to the grid 150 of the control triode 151. The plate 152 of the control diode is connected in parallel with the screen 136 of the oscillator 130 to +B through the resistor 137. In this circuit when the load current increases the voltage across resistor 144 will decrease. The positive control voltage produced by the rectifier 147 will therefore decrease with increasing load. This control voltage when applied to the grid 150 of the triode will render the control tube less conducting as the load increases so that the current drawn through resistor 137 will decrease with the load. The voltage drop across resistor 137 therefore decreases with the load so that the voltage applied to screen grid 136 will increase with the load to provide the required regulation. Resistor 153 connected to the cathode 154, which is common to the diode 147 and the triode 151, provides degenerative action. The condenser 155 serves to filter the bias applied to the grid 150.

As fully set forth above, the voltage regulation system in accordance with the invention provides very effective regulation of high voltage power supplies as required for providing anode potential for cathode ray tubes such as used in television receivers. The voltage regulation system is simple and inexpensive requiring only a single triode and a few coupling elements. In the system operating from the filtered high voltage as illustrated in Fig. 5, the diode required can be combined in a single envelope with the control triode providing a very simple and inexpensive arrangement. The voltage regulation system is very flexible and can be adjusted to provide a uniform voltage or either a rising or falling characteristic as may be desired. The range of output currents over which the regulation is effective can be adjusted to provide the range required with a minimum of voltage loss.

Although certain embodiments of the invention have been described which are illustrative thereof, it is obvious that various changes and modifications can be made therein without departing from the intended scope of the invention as defined in the appended claims.

I claim:

1. In electronic apparatus including a cathode ray tube having an anode, and deflecting coils for deflecting the beam of said tube, a system for producing a sawtooth current wave for deflecting the beam of said tube and for producing high voltage for accelerating the beam of said tube comprising, an oscillator including an electron discharge valve having plate and screen grid electrodes and inductance means, said plate electrode being connected to said inductance means for producing a sawtooth current wave therein with a pulse voltage wave being produced thereacross, said inductance means including a winding connected to the deflecting coils of said cathode ray tube for producing a fluctuating magnetic field therethrough, rectifier means connected to said inductance means for rectifying the high voltage pulses produced therein to develop a high direct current voltage therefrom, said rectifier means including a load circuit connected to the anode of said cathode ray tube, with the anode drawing varying load current from said rectifier means, said load circuit including resistor means across which a control voltage is developed which varies with said anode current, a control tube having input and output electrodes, means connecting said resistor means to said input electrode of said control tube for applying said control voltage thereto, and means connecting said output electrode of said control tube to said screen grid electrode of said electron discharge valve for providing a potential on said screen grid which increases with increasing anode current, said increasing screen potential increasing the amplitude of said oscillations so that the high voltage applied to the anode and the sawtooth current wave applied to the deflection coils remain substantially constant for variations in the anode current through a predetermined range.

2. In electronic apparatus including a cathode ray tube having an anode, and deflecting coils for deflecting the beam of said tube, a system for producing sawtooth currents for deflecting the beam of said tube and for producing high voltage for accelerating the beam of said tube comprising, an oscillator including an electron discharge valve having plate and screen grid electrodes and inductance means, said plate electrode being connected to said inductance means for producing a sawtooth current wave therein, said inductance means including a winding connected to the deflecting coils of said cathode ray tube for producing a fluctuating magnetic field therethrough, rectifier means connected to said inductance means for rectifying the high voltage pulses produced therein to develop a high direct current voltage therefrom, said rectifier means including a load circuit connected to the anode of said cathode ray tube, with the anode drawing varying load current from said rectifier means, said load circuit including resistor means through which said load current flows to develop a control voltage which is directly proportional to said anode current, a control tube having input and output electrodes, means connecting said resistor means to said input electrode of said control tube for applying said control voltage thereto, and means connecting said output electrode of said control tube to said screen grid electrode of said electron discharge valve for providing a potential on said screen grid which increases with increasing anode current, said increasing screen potential increasing the amplitude of said oscillations so that the high voltage applied to the anode and the sawtooth current wave applied to the deflection coils remain substantially constant for variations in the anode current through a predetermined range.

3. In electronic apparatus including a cathode ray tube having an anode, and deflecting coils for deflecting the beam of said tube, a system for producing a sawtooth current wave for deflecting the beam of said tube and for producing high voltage for accelerating the beam of said tube including in combination, generator means including an electron discharge valve having control grid, screen grid and plate electrodes, means for applying a sawtooth voltage wave to said control grid, inductance means, means connecting said plate electrode to said inductance means so that a sawtooth current wave is produced therein and a pulse voltage wave is produced thereacross, said inductance means including a portion connected to the deflecting coils of said cathode ray tube for producing a fluctuating magnetic field therethrough, rectifier means connected to said inductance means for rectifying the high voltage pulses produced therein to develop a high direct current voltage therefrom, said rectifier means including a load circuit connected to the anode of said cathode ray tube, with the anode drawing varying load current from said rectifier means, said load circuit including resistor means across which a control voltage is developed which varies with said anode current, a control tube having input and output electrodes, means connecting said resistor means to said input electrode of said control tube for applying said control voltage thereto, and means connecting said output electrode of said control tube to said screen grid electrode of said electron discharge valve for providing a potential on said screen grid which increases with increasing anode current, said increasing screen potential increasing the amplitude of said voltage pulse wave from said generator means so that the high voltage applied to the anode and the sawtooth current wave applied to the deflection coils remain substantially constant for variations in the anode current through a predetermined range.

4. In electronic apparatus including a cathode ray tube having an anode, and deflecting coils for deflecting the beam of said tube, a system for producing a sawtooth current wave for deflecting the beam of said tube and for producing high voltage for accelerating the beam of said tube including in combination an oscillator including an electron discharge valve having plate and screen grid electrodes, inductance means including first and second windings connected in series and a third winding, and means connecting said plate electrode to said first winding of said inductance means so that a sawtooth current wave is produced therein and a pulse voltage wave is produced thereacross, means connecting said third winding of said inductance means to the deflecting coils of said cathode ray tube for producing a fluctuating magnetic field therethrough, rectifier means connected across said first and second series connected windings of said inductance means for rectifying the high voltage pulses produced therein to develop a high direct current voltage therefrom, said rectifier means including a load circuit connected to the anode of said cathode ray tube, with the anode drawing varying load current from said rectifier means, said load circuit including resistor means across which a control voltage is developed which varies with said anode current, a control tube having input and output electrodes, means connecting said resistor means to said input electrode of said control tube for applying said control voltage thereto, and means connecting said output electrode of said control tube to said screen grid electrode of said electron discharge valve for providing a potential on said screen grid which increases with increasing anode current, said increasing screen potential increasing the amplitude of said oscillations so that the high voltage applied to the anode and the sawtooth current wave applied to the deflection coils remain substantially constant for variations in the anode current through a predetermined range.

5. In electronic apparatus including a cathode ray tube having an anode, and deflecting coils for deflecting the beam of said tube, a system for producing a sawtooth current wave for deflecting the beam of said tube and for producing high voltage for accelerating the beam of said tube including in combination, an oscillator including an electron discharge valve having plate and screen grid electrodes, inductance means, a source of potential, said plate electrode being connected to said inductance means for producing a sawtooth current wave therein and a pulse voltage wave thereacross, said inductance means including a winding connected to the deflecting coils so that a fluctuating magnetic field is produced thereby, rectifier means connected to said inductance means for rectifying said high frequency oscillations to produce a high direct current voltage, a load circuit connecting said rectifier means to the cathode ray tube anode and drawing varying load current from said rectifier means, said load circuit including a filter having resistor means across which a control voltage is developed which varies inversely with the current in said anode, a control tube having input and output electrodes, coupling means including a rectifier for connecting said resistor means to said input electrode of said control tube, said coupling means providing a positive bias for said input electrode which decreases with increasing load current, and common impedance means connecting said output electrode of said control tube and said screen grid electrode of said electron discharge valve to said source of potential, said control tube being biased so that the current in said output electrode decreases with increasing anode current to decrease the potential across said common impedance means and increase the potential on said screen grid, so that the amplitude of said oscillations increases with decreasing anode current and said high direct current voltage remains substantially constant for variations in the load current through a predetermined range.

References Cited in the file of this patent

UNITED STATES PATENTS

| Number | Name | Date |
|---|---|---|
| 2,175,694 | Jones | Oct. 10, 1939 |
| 2,302,876 | Malling | Nov. 24, 1942 |
| 2,352,988 | Wilcox | July 4, 1944 |
| 2,424,905 | Scheldorf | July 29, 1947 |
| 2,440,786 | Schade | May 4, 1948 |
| 2,470,197 | Torsch | May 17, 1949 |
| 2,495,696 | Cawein | Jan. 31, 1950 |
| 2,495,938 | Loughlin | Jan. 31, 1950 |
| 2,523,051 | Norgaard | Sept. 19, 1950 |
| 2,545,997 | Hagopian | Mar. 20, 1951 |